United States Patent Office 3,551,336
Patented Dec. 29, 1970

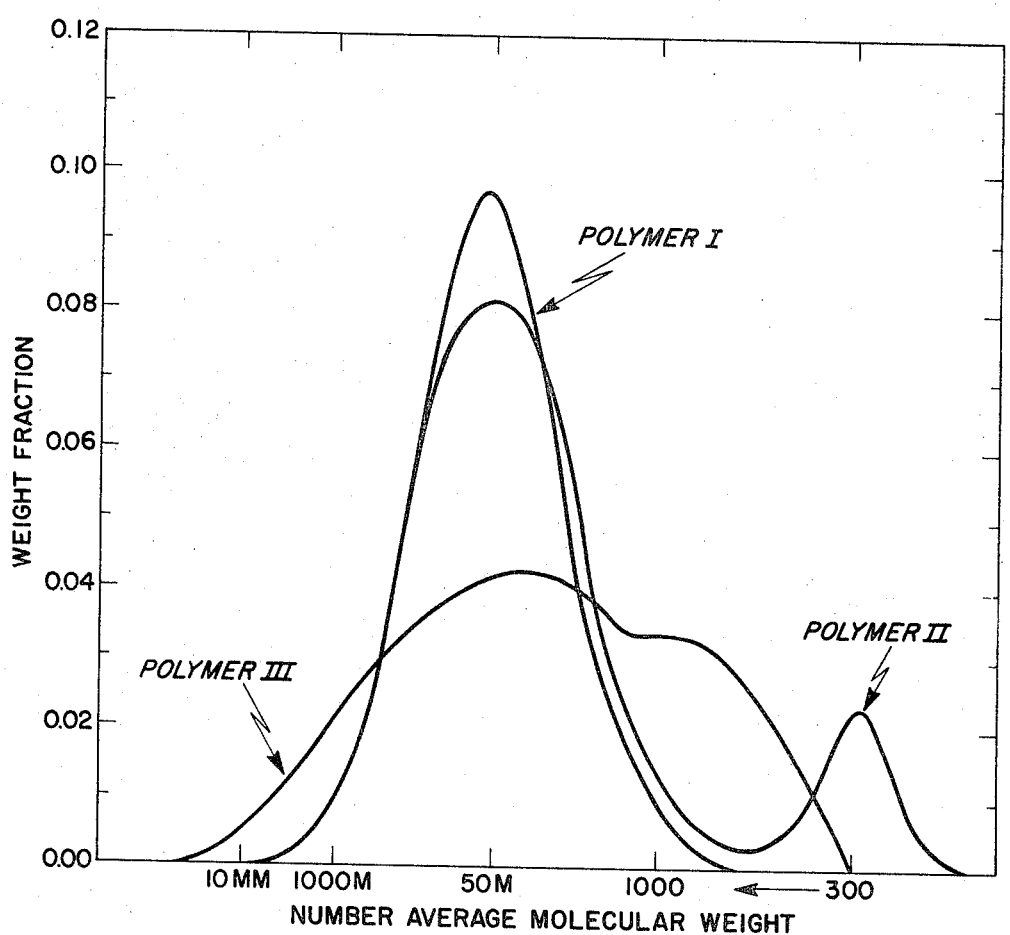

3,551,336
LUBRICANT CONTAINING ETHYLENE-ALPHA-OLEFIN POLYMER
Norman Jacobson, East Brunswick, Darrell W. Brownawell, Scotch Plains, and Edward N. Kresge, Watchung, N.J., assignors to Esso Research and Engineering Company, a corporation of Delaware
Continuation-in-part of application Ser. No. 657,064, July 31, 1967. This application June 30, 1969, Ser. No. 837,733
Int. Cl. C10m 1/16
U.S. Cl. 252—59                    10 Claims

ABSTRACT OF THE DISCLOSURE

An essentially haze-free oil composition comprising a lubricating oil and an oil-soluble polymer comprised of ethylene and a $C_3$ to $C_{18}$ alpha-olefin, preferably propylene, said polymer being characterized by the following combination of parameters: (a) an ethylene content within the range between about 60 and 80 mole percent, wherein said polymer contains no more than about 1.3% by weight of a polymer fraction which is insoluble in normal decane at 45° C.; (b) a degree of crystallinity less than about 25%; (c) an $\overline{M}w/\overline{M}n$ ratio less than about 4.0; and (d) a viscosity average molecular weight within the range between about 10,000 and 200,000.

The polymers are prepared by polymerizing ethylene and an alpha-olefin in the presence of a controlled amount of hydrogen and a soluble species of a Ziegler catalyst. Polymers of ethylene and propylene prepared in the presence of a catayslt comprised of vanadium oxy trichloride and ethyl aluminum sesquichloride are especially preferred.

CROSS-REFERENCE TO RELATED APPLICATION

This is a continuation-in-part of application Ser. No. 657,064, filed July 31, 1967.

BACKGROUND OF THE INVENTION

Field of the invention

This invention relates to novel lubricant additives and the preparation thereof. More particluarly, the invention is concerned with lubricating oils containing certain polymers prepared from ethylene and at least one other alpha-olefin.

Description of the prior art

An important property of a lubricant composition is the rate at which its viscosity changes as a function of temperature. The relationship between the viscosity and temperature is commonly expressed in the art as the viscosity index (V.I.). Lubricant compositions which change little in viscosity with variations in temperature have greater viscosity index than do compositions whose viscosity is materially affected by changes in temperature. In this connection, the viscosity index of a lubricant composition has in the past been determined by measuring the viscosity of the oil at 210° F. and 100° F. and extrapolating to 0° F. The measured 210° F. viscosity and the extrapolated 0° F. viscosity are used to calculate the viscosity index of the oil.

In the case of motor oils which contain polymeric viscosity index improvers, the extrapolated 0° F. viscosity is usually much lower than its measured value since motor oils containing polymeric additives are non-Newtonian. Many of the well-known viscosity index improvers such as polyisobutylene and polymethacrylates, impart a high viscosity index (based on extrapolated 0° F. viscosity) to an oil but in actual practice these additives are found to thicken the motor oil to an undesirably large degree at 0° F. It is now recognized that viscosity index alone is not a true measure of an oil's effectiveness in facilitating cold starting and minimizing friction and engine wear. Accordingly, the direct determination of the low temperature (0° F.) viscosity of a motor oil under engine conditions by use of a suitable device such as the engine viscosity simulator disclosed in U.S. Pat. No. 3,350,922, is necessary in order to evaluate the viscosity characteristics imparted by a viscosity index improver.

Beside the attainment of V.I. improvement and good low temperature viscosity characteristics, consideration must also be given to the solubility of the polymer additive in the base composition, as well as the additive stability against breakdown under shear stresses encountered in its application. In the synthesis of polymeric V.I. agents to date, it has generally been found that solubility and shear stability are inversely proportional to the molecular weight of the polymer. Since the greatest V.I. effect has been obtained from poylmers of the highest molecular weight, effectiveness has, disadvantageously, been sacrificed in order to insure proper stability in respect to resistance against shear stresses and to attain the desired solubility of the additives. Thus, the V.I. improving characteristic of additives has been undesirably restricted by limitation of one of the aforementioned characteristics.

Another feature of V.I. improvers is the amount of additive necessarily utilized in order to attain the desired V.I. improvement. This measure of effectiveness of an additive, as reflected by the amounts utilized, may be referred to as the thickening potency of the additive. It is readily apparent, therefore, that in addition to effective V.I. improvement with accompanying shear stability, solubility, etc., it is highly desirable to prepare a V.I. improver which has a thickening potency such that smaller amounts of additive as compared to amounts conventionally employed can be utilized to attain the desired improvements.

Many of the commercialized viscosity index improvers such as the polyisobutenes, polymethacrylates, fumaric acid ester copolymers, polyacrylates and polyalkylstyrenes are deficient in that they thicken motor oils to an undesirably large degree at low temperatures and/or exhibit substantial shear breakdown and/or are deficient in one or more of the other aformentioned viscosity index improver characteristics.

Other polymers suggested as useful oil additives include ethylene/alpha-olefin polymers such as ethylene-propylene copolymers. In general, these oil additives are low molecular weight ethylene/alpha-olefin copolymers which are used to depress the pour point of heating oils. Heretofore, however, ethylene/alpha-olefin polymers have not found wide acceptance as lubricant viscosity index improvers.

These ethylene based polymers, particularly copolymers of ethylene and propylene, would not appear to be acceptable commercial viscosity index improvers since they would be expected to produce hazy oils and exhibit poor low temperature solubility since they do not contain the oil-solubilizing long alkyl side chains possessed by conventional viscosity index improvers. Indeed, as discussed more fully hereinafter, the production of relatively haze-free oil compositions containing ethylene-propylene copolymers has been found to be extremely difficult. Of course, a motor oil containing a significant amount of visual haze is unacceptable from the view point of consumer appeal and poor performance due to the presence of oil-insolubles which could cause problems such as filter plugging, oil screen plugging and polymer drop out as sludge especially in centrifugal pumps.

SUMMARY OF THE INVENTION

In accordance with this invention, an essentially haze-free oil composition useful as a lubricant contains a V.I. improver an oil-soluble polymer comprised of ethylene and a $C_3$ to $C_{18}$ alpha-olefin, said polymer being characterized by the following combination of parameters: (a) an average ethylene content within the range between about 60 to 80 mole percent, wherein said polymer contains no more than about 1.3% by weight of a polymer fraction which is insoluble in normal decane at 45° C.; (b) a degree of crystallinity less than 25%; (c) an $\overline{M}w/\overline{M}n$ (i.e. weight average molecular weight/number average molecular weight) ratio less than about 4.0; and (d) a viscosity average molecular weight within the range between about 10,000 and 200,000. The polymers of the invention besides exhibiting low haze when added to lubricating oils, are found to have the unusual combination of properties including excellent V.I. improving characteristics, high thickening potency and excellent shear stability. Such combination of properties render the polymers of this invention especially useful in lubricating oils of both the mineral and synthetic type.

The alpha-olefins which are of interest and used in the preparation of the V.I. improvers of this invention include those monomers containing from 3 to about 18 carbon atoms. The alpha-olefins may be linear or branched where the branching occurs three or more carbon atoms from the double bond, and, while a single olefin is preferable, mixtures of these $C_3$ to $C_{18}$ olefins may be employed. It is most preferred, however, that the ethylene monomer be copolymerized with propylene. Suitable examples of $C_3$ to $C_{18}$ alpha-olefins include, among others, propylene, 1-butene, 1-pentene, 1-hexene, 1-heptene, 1-octene, 1-nonene, 1-decene, 4-methyl-1-pentene, 4-methyl-1-hexene, 5 - methyl-1-hexene, 4,4-dimethyl-1-pentene, 4-methyl-1-heptene, 5-methyl-1-heptene, 6-methyl-1-heptene, 4,4-dimethyl-1-hexene, 5,6,5-trimethyl-1-heptene and mixtures thereof.

While ethylene-propylene copolymers are preferred for the purposes of this invention, when propylene is employed as the comonomer, i.e., with ethylene, it is also possible to use a third monomer which may be one or more of the aforedescribed $C_4$ to $C_{18}$ alpha-olefins and/or $C_6$ to $C_{28}$ diolefins. These unsaturated monomers are also preferably linear, but may be branched where the branching occurs three or more carbon atoms from the double bond, and, while a single olefinic monomer is preferable, mixtures of these olefinic monomers may also be employed. The amount of the third monomer contained in the polymer ray range from 0 to about 10 mole percent, e.g., 0.5 to 5.0 mole percent.

The diolefins which are useful for copolymerization with ethylene and propylene include the bicyclic, alicyclic or aliphatic nonconjugated diolefins containing from about 6 to about 28 carbon atoms, preferably from about 6 to 12 carbon atoms. Nonlimiting examples of suitable monomers include 1,5-cyclooctadiene, 1,4-hexadiene, dicyclopentadiene, methylene-norbornene, 5-vinyl-2-norbornene, 1,5-cyclodecadiene, 2,4-dimethyl - 2,7 - octadiene, 3(2-methyl-1-propenyl) cyclopentene, 1,5-octadecadiene, and the like.

The polymers of the invention contain from about 60 to 80 mole percent (e.g., 70 to 78 mole percent) of ethylene and 20 to 40 mole percent of the aforedescribed $C_3$ to $C_{18}$ alpha-olefin. It is preferred, however, that the polymer contain from 72 to 80 mole percent ethylene and 20 to 28 mole $C_3$–$C_{18}$ alpha-olefin, preferably propylene. The preferred compositional range is based upon the finding that polymers containing more than 80 mole percent ethylene contribute substantial amounts of haze to oils when blended therewith while polymers containing less than about 72 mole percent ethylene will give a greater increase in the low temperature (0° F.) viscosity of an oil containing same under engine cranking conditions.

As indicated above, in order for a material to be a commercially acceptable motor oil additive, it must produce an essentially haze-free oil composition when incorporated therein. The aforedescribed polymer of this invention will produce an oil composition having good haze properties well within acceptable limits. The haze-forming tendencies of ethylene-alpha-olefin Ziegler polymers, especially ethylene-propylene copolymers, is related to its compositional distribution and molecular weight distribution. This is particularly true in the case of ethylene-propylene copolymers. It has been found that the polymers having more than about 1.3 wt. percent of a fraction which is insoluble in normal decane at 45° C. will produce significant amounts of haze in oils. Accordingly, the polymer of the invention will not contain more than about 1.3 wt. percent of this insoluble fraction. Preferably, the polymer of the invention will contain less than 0.5 wt. percent, more preferably essentially none of a polymer fraction which is insoluble in normal decane at 45° C. The presence of this undesired normal decane-insoluble fraction indicates that the compositional distribution (and in some instances also the molecular weight distribution) of the polymer is relatively broad and that the polymer contains a fraction which has a high ethylene content, i.e. an ethylene content greater than the average ethylene content of the total polymer. It is the high ethylene fraction which is insoluble in normal decane at 45° C. Generally, the normal decane-insoluble fraction will have an ethylene content above 82 mole percent. In this connection, a precise method of determining the amount of polymer fraction which is insoluble in normal decane at 45° C. is given hereinafter in Example 3 where a normal decane solution containing a specified amount of polymer (i.e., 0.758 gram of polymer in 100 milliliters of normal decane) is subjected to defined conditions of separation.

The ethylene content of the aforedescribed polymers was measured in the following manner. A series of copolymer standards were prepared using $C_{14}$ labeled ethylene. The ethylene content of these polymers was conventionally measured by a radioactive counting method. The polymers were combusted to $CO_2$ which was trapped in alcoholic ethanolamine and counted in solution. A sample of polyethylene was also synthesized and counted to determine the activity of the starting monomer. An infrared method was then standardized using the samples of known ethylene content. The adsorbance ratio at 8.6 microns (methyl groups) and 13.9 microns (methylene sequences) was determined on a Beckman 5A Infrared Spectrometer and correlated with the $C_{14}$ ethylene values.

The ethylene-alpha-olefin polymers of this invention will have a viscosity average molecular weight ($\overline{M}v$) of about 10,000 to about 200,000, preferably 30,000 to 100,000. Unless otherwise specified, the term "molecular weight" as used herein means molecular weight based on viscosity measurement. The molecular weights indicated herein and in the claims hereof were determined by viscosity measurements in decalin at 135° C. and calculated by the formula $\eta=(K'\times 10^{-4})\overline{M}v^{0.74}$ in which $\eta$ represents intrinsic viscosity and $K'$ varies from 2.22 for a polymer containing no ethylene, i.e., a homopolymer of propylene, to 5.86 for a homopolymer of ethylene. In this connection, $K'=1.15K$ wherein K relates $\eta$ and $\overline{M}v$ according to the method outlined by G. Moraglio in Chimica l'Industria 41, 984 (1959).

The polymers of this invention have a degree of crystallinity up to about 25%, preferably 3 to 18%, and a surprisingly narrow molecular weight distribution. The surprisingly narrow molecular weight distribution of the polymers of this invention is evidenced by the fact that the number average molecular weight, $\overline{M}n$, and the weight-average molecular weight, $\overline{M}w$, of the ethylene-alpha-olefin polymers are similar in value. As is generally known, only when there is one molecular species, all molecules of which have the same molecular weight, will the values of $\overline{M}n$ and $\overline{M}w$ be equal. The narrow molecular weight distribution of the polymers of this invention may be characterized by the ratio $\overline{M}w/\overline{M}n$ wherein said ratio is less than about 4.0, preferably less than 2.6, e.g., 2.2.

The determination of the ratio $\overline{M}w/\overline{M}n$ was made by the gel permeation chromatography (GPC) technique. The procedure used was as follows: Four polystyrene gel separation columns containing average gel pore sizes of $10^6$, $10^5$, $10^4$ and $10^3$ A., respectively, were connected in series for the fractionation of the polymer. The solvent employed was trichlorobenzene, and the separations were conducted at 135° C. using a flow rate of 1 ml./min. The samples were introduced into the system as 0.5 wt. percent solutions using an injection time of 60 seconds. A correlation between elution volume (expressed as "counts" with one count equal to 5 ml.) and molecular weight relevant to these operating conditions was obtained from the peak elution volumes of a series of narrow polystyrene fractions of known molecular weight. The calibration standards obtained from Pressure Chemical Co., Pittsburgh, Pa., covered the molecular weight range from 4,800 to 2,145,000. The standard molecular weights were converted to equivalent chain length values (A.) and the correlation between equivalent chain length and count number (elution volume) was employed in the analysis of ethylene-alpha-olefin, e.g., propylene, distribution curves.

The treatment of the raw GPC data (in the form of continuously plotted curves) for the ethylene-alpha-olefin samples essentially followed classical molecular weight distribution techniques. For a given sample the height of the distribution curve above the base line was measured (in any convenient units) at regular elution volume intervals over the entire distribution. The interval employed was ½ count (2½ ml.). The height at a given count was taken as a measure of the weight fraction of the sample having an equivalent chain length corresponding to that particular elution volume. The measured heights were then normalized to yield the corresponding weight fractions which were used to compute the number average equivalent chain length and the weight average equivalent chain length.

With regard to the degree of crystallinity of the copolymers utilized in the present invention, it was found that two independent techniques employed to determine same led to unexpectedly good experimental agreement. The two methods utilized were X-ray diffraction and differential thermal analysis.

Accordingly, differential thermal analysis and X-ray diffraction patterns indicate a degree of crystallinity up to about 25%. It is preferred, however, that the degree of crystallinity be within the range of from about 3 to about 18%.

The polymers of this invention are prepared by employing Ziegler polymerization techniques which will produce a polymer within the scope of the defined parameters. Many Ziegler catalyst systems investigated, however, have produced polymers falling outside the scope of the polymer definition and the resultant polymers imparted visible haze to oil compositions containing same.

Thus, while theoretically various Ziegler catalyst combinations such as described in U.S. Pat. No. 3,051,690 should be suitable, to date only vanadium oxy chloride and ethyl aluminum sesquichloride when used in combination with hydrogen have been found to directly yield a polymer having the requisite characetristics described above, particularly with respect to their relative freedom from haze formation as indicated by the characteristic of less than 1.3% by weight of a polymer fraction which is insoluble in normal decane at 45° C.

Thus, the preferred process of the present invention is to polymerize ethylene with an alpha-olefin, especially propylene, in the presence of the combination of vanadium oxy chloride and ethyl aluminum sesquichloride, using hydrogen and a solvent medium. Hydrogen may be introduced incrementally or substantially at a single charge at various stages of the polymerization process, and can be mixed with an inert gas such as nitrogen or with a gaseous monomer and sparged through the reaction mixture, or retained as a blanket over it. It is preferred, however, to mix the hydrogen with the monomer feed.

As noted above, various well-known Ziegler catalyst systems were found to give unacceptable polymers as to haze formation, crystallinity, molecular weight distribution and wide compositional distribution. It is possible, however, in some instances to use selected Ziegler catalysts which may yield a polymer departing only somewhat from the characteristics of the present invention, and then use a complementary separation technique such as solvent fractionation to isolate the polymer of the invention from the total polymer thus formed. Even in this case only a rather narrow group of Ziegler catalysts appear suitable. By way of illustration, the instant polymer product can be prepared by polymerizing ethylene and propylene in the presence of hydrogen and a vanadium tetrachloride-ethyl aluminum sesquichloride catalyst system and by dissolving the polymer thus produced in normal decane at 95° C. The solution is then cooled to about 45° C. and then centrifuged to remove the high ethylene content insoluble fraction and produce a soluble polymer fraction within the scope of the present invention. It should be noted, however, that mere removal of the normal decane-insoluble fraction from typical Ziegler ethylene-propylene copolymers will not produce the present polymer product since the soluble polymer may still lack the requiiste narrow molecular weight distribution, ethylene content, and/or crystallinity.

The soluble Ziegler catalyst thus preferred is formed by mixing an alkyl-aluminum halide such as ethyl aluminum sesquichloride with vanadium compositions such as vanadium oxychloride ($VOCl_3$).

The monomers of this invention may be polymerized in the presence of various solvents. They include aliphatic, naphthenic, aromatic and halogenated hydrocarbon solvents, mineral oils, or an excess of the higher alpha-olefin such as propylene may be used. Specific examples of solvents include n-hexane, heptane, propane, cyclohexane, toluene, xylenes, tetrachloroethylene, decalin and chlorobenzene, preferably, n-hexane.

A summary of typical ranges of monomer concentrations, catalyst concentrations, hydrogen concentrations, and process variables employed in the process of this invention follow. It is to be understood that due to the complexity and large number of the variable combinations possible, that some undesirable and, indeed, inoperable polymers may result especially when the extremes of the various parameters are utilized. However, one skilled in the art should, with reasonable experimentation, be able to reproduce a copolymeric product exhibiting the physical characteristics of ethylene-alpha-olefin polymers of the present invention.

|  | Preferred | More preferred | Most preferred |
|---|---|---|---|
| Catalyst composition, Al/V molar ratio | 1 to 50 | 2 to 30 | 3 to 15. |
| Catalyst concentration in the feed, catalyst/total monomer weight ratio. | $2 \times 10^{-4}$ to $2 \times 10^{-2}$ | $8 \times 10^{-4}$ to $1 \times 10^{-2}$ | $1 \times 10^{-3}$ to $8 \times 10^{-3}$. |
| Hydrogen concentration, mole percent based on the total moles of monomer feed. | 0.01 to 20 | 0.01 to 10 | 0.025 to 5.0. |
| Process variables: |  |  |  |
| Temperature, °C | −20 to 100 | 10 to 90 | 30 to 70. |
| Pressures, atm | 0.5 to 100 | 0.75 to 50 | 1 to 15. |
| Reation or contact time, mins | 1 to 180 | 3 to 120 | 5 to 40. |
| Monomer feed composition: |  |  |  |
| Ethylene/alpha-olefin wieght ratio | .1 to 10 | .5 to 5 | .9 to 4. |

When the polymeric additives of the present invention are employed in lubricating oils such as crankcase oils, hydraulic oils, automatic transmission oils, industrial oils, greases, and the like, they are preferably added in proportion of about 0.01 to about 30.0% or more, preferably about 0.1 to 10.0, and more preferably about 0.3 to 2.5 by weight based on oil. The proportions giving the best results will vary somewhat according to the nature of the lubricating oil base stock and the specific purpose for which the lubricant is to serve in a given case. Typically, such additives are sold as concentrates wherein the additive is present in amounts of from 5 to 50 wt. percent, preferably 6 to 25 wt. percent, based on the total amount of the hydrocarbon, e.g. mineral oils, hexane, heptane and the like, employed for the additive.

In the oil compositions containing the polymers of this invention, hydrocarbon mineral oil may be employed as the base material, such as paraffin base, naphthene base or mixed paraffin base distillate or residual oils. Paraffin base distillate lubricating oil fractions are used in the formulation of premium grade motor oil such as contemplated in this invention. The well-known synthetic lubricating bases of the ester or ether type may also be used as the lubricating base oil. Broadly speaking, a mineral or synthetic lubricating oil having an SUS viscosity at 100° F. between about 50 and 1000 may be used in the formulation of the improved lubricants of this invention. Usually the viscosity range falls between 70 and 300 SUS at 100° F.

Specific examples of synthetic base oils include, among others, esters of monobasic acids (e.g., ester of $C_8$ Oxo alcohol with $C_8$ Oxo acid, ester of $C_{13}$ Oxo alcohol with octanoic acid, etc.), esters of dibasic acids (e.g., di-2-ethyl hexyl sebacate, di-nonyl adipate, etc.), esters of glycols (e.g., $C_{13}$ Oxo acid diester of tetraethylene glycol, etc.), complex esters (e.g., the complex ester formed by reacting one mole of sebacic acid with two moles of tetramethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ Oxo alcohol, and one mole of $C_8$ Oxo acid), esters of phosphoric acid (e.g., the ester formed by contacting three moles of the monomethyl ether of ethylene glycol with one mole of phosphorus oxychloride, etc.), halocarbon oils (e.g., the polymer of chlorotrifluoroethylene containing 12 recurring units of chlorotrifluoroethylene), alkyl silicates (e.g., polymethyl siloxanes, polyalkyl siloxane, ethyl polysiloxanes, methylphenyl polysiloxanes, ethylphenol polysiloxanes, etc.), sulfite esters (e.g., ester formed by reacting one mole of sulfur oxychloride with two moles of the methyl ether of ethylene glycol, etc.), carbonates (e.g., the carbonate formed by reacting $C_8$ Oxo alcohol with ethyl carbonate to form a half ester and reacting this half ester with tetraethylene glycol), mercaptals (e.g., the mercaptal formed by reacting 2-ethyl hexyl mercaptan with formaldehyde, formals (e.g., the formal formed by reacting $C_{13}$ Oxo alcohol with formladehyde), polyglycol type synthetic oils (e.g., the compound formed by condensing butyl alcohol with 14 units of propylene oxide, etc.), or mixtures of any of the above (or with mineral, animal or vegetable oils) in any proportions may also be used.

The polymers of the invention can be employed alone in lubricant compositions, or if desired, can be employed in combination with other viscosity index improvers in order to affect that characteristic of the base lubricant composition. If desired, the polymers may be employed in combination with other additives, for example, pour point depressants; detergent type additives, such as barium nonyl phenol sulfide, calcium tertiary-amylphenol sulfide, nickel oleate, barium octadecylate, calcium phenol sterate, zinc di-isopropyl salicylate, aluminum naphthenate, calcium cetyl phosphates, barium di-tertiary-amylphenol sulfide, calcium petroleum sulfonate, zinc methylcyclohexyl thiophosphate and calcium dichlorostearate; etc.

The present invention also contemplates that the polymers described herein can be subjected to such aftertreatment as may be desired to fit them for particular uses or to impart desired ancillary properties. It is to be understood, therefore, that the invention polymers can be subjected to chemical modifying treatments, such as halogenation, halogenation followed by dehalogenation, sulfohalogenation by treatment with sulfuryl chloride, or mixtures of chlorine and sulfur dioxide, sulfonation, as well as any other reaction to which hydrocarbons may be subjected. In addition, it is also contemplated that the invention polymers can be blended with other polymers so as to impart various desired properties thereto.

BRIEF DESCRIPTION OF THE DRAWING

The drawing is a graphic representation of the molecular weight distribution of three different ethylene-propylene copolymers. The aforedescribed gel permeation chromatography (GPC) technique was used in determining these molecular weight distribution curves. Other properties of these polymers and their methods of preparation are given below in Example 3.

The following examples describe the invention more fully, both from a standpoint of the preparation of the polymers and of their advantageous use in typical lubricant compositions.

DESCRIPTION OF THE PREFERRED EMBODIMENTS

Example 1

Ethylene and propylene were continuously polymerized in the presence of n-heptane solvent, a vanadium oxychloride-ethyl aluminum sesquichloride catalyst, and hydrogen. The polymerization reaction was carried out in a two-liter glass reactor equipped with a monomer inlet tube, catalyst inlet, co-catalyst inlet, solvent inlet, reflux condenser, stirrer, product recovery outlet and a temperature control jacket. Provision was made to continuously control the rate of addition of monomer, hydrogen, solvent, catalyst and co-catalyst. The reaction was carried out continuously under conditions of constant volume and pressure (i.e., 1 atmosphere) by controlling the rate of feed introduction and product removal. The ethylene and propylene monomers were purified by contact with hot (e.g., 150° C.) copper oxide and molecular sieves. Purification of the solvent, i.e. n-heptane, was effected by passage through a bed of alumina and silica gel. Similarly, the hydrogen gas was dried by passage through a silica gel bed. The entire system was maintained oxygen and moisture-free by blanketing with nitrogen. A solution of vanadium oxychloride ($VOCl_3$) in n-heptane corresponding to a 0.03 molar solution was introduced through the catalyst inlet while a solution of ethyl aluminum sesquichloride ($Al_2Et_3Cl_3$) in n-heptane corresponding to a 0.12 molar solution was introduced through the co-catalyst inlet. The reactor operating conditions were as shown in Table I.

TABLE I

Temperature, ° C.—55.
Solvent volume, liters @ 1 atm., 25° C.—1.5.
Monomer Feed Composition:
  Volume percent propylene—75
  Volume percent ethylene—25
Monomer feed rate, liters/minute—3.0.
Hydrogen feed rate, cubic centimeters/minute @ 1 atm., 25° C.—30.
$VOCl_3$ catalyst solution feed rate, cubic centimeters/minute—1.0.
Catalyst composition, Al/V molar ratio—5.0.
Reactor residence time, minutes—20.

A sample of the product stream was removed and a polymeric product was recovered by steam distilling off the solvent and vacuum drying the product at 50° C. The copolymer recovered had the properties shown in Table II.

TABLE II

Mole percent ethylene—77.
Inherent viscosity @ 135° C. Decalin, dl./g.—2.01.
V.I.[1]—135.
Thickening efficiency [2]—2.7.
Fraction of polymer insoluble in normal decane @ 45° C.—0.0.
Crystallinity, percent—11.5.
Molecular weight distribution, $\overline{M}w/\overline{M}n$—2.2.

[1] Viscosity Index as determined by ASTM D-567 in Solvent 150 Neutral which is a solvent extracted, neutral, paraffinic-type oil having a viscosity of 150 SUS @ 100° F.
[2] Thickening Efficiency is the ratio of wt. percent polyisobutylene (20,000 Staudinger mol. wt.) Paratone N sold by Enjay Chemical Company required to thicken Solvent 150 Neutral to a viscosity of 12.4 centistokes (cs.) at 210° F./wt. percent ethylene-propylene copolymer required to thicken Solvent 150 Neutral to the same viscosity.

Example 2

As has been pointed out, polymeric additives which impart significant amounts of visible haze to oils are unacceptable for use in motor oils. Ziegler polymers prepared from ethylene and lower alpha-olefins, especially propylene, would be expected to form substantial amounts of haze in motor oils since these polymers are essentially linear, relatively high in molecular weight and do not contain oil-solubilizing long alkyl side chains such as the commercially available viscosity index improvers. In fact, a large number of polymerizations have been carried out using various Ziegler catalysts in conjunction with a number of chain transfer agents. In the vast majority of these polymerizations, the products produced were unsuitable or required fractionation to produce the low haze-forming polymer of the invention.

The technique and apparatus which was used herein for measuring haze is described in U.S. Pat. No. 3,358,148 which is incorporated herein by reference. Briefly, the haze measurement is obtained by passing a light beam through a sample and measuring the amount of light transmitted by means of a conventional light meter. The light transmitted through the oil sample is greatest for those oils having the lowest degree of haze. The actual haze measurement was made by placing a standard or reference oil containing none of the polymer to be evaluated in the sample tube, passing a light beam therethrough and adjusting the light meter reading to a reference level. The haze-forming characteristics of a polymer were determined herein by blending sufficient polymer into the reference oil to give an oil blend having a viscosity at 210° F. of 12±.5 cs. In this example, 0.9% by weight of the test polymers (based on oil) were blended with the reference oil. The polymer-oil blend was then tested in the apparatus in the same manner as the reference sample and the meter reading was observed. In this test, an oil blend having a haze less than 13 units would be considered acceptable for commercial use.

In this example, ethylene-propylene copolymers having similar average ethylene contents and average molecular weights were compared in haze-forming characteristics. The copolymers were prepared in the presence of hydrogen and a catalyst system consisting of (A) vanadium oxy trichloride-ethyl aluminum sesquichloride or (B) vanadium tetrachloride-ethyl aluminum sesquichloride or (C) vanadium tetrachloride-diethyl aluminum chloride. The specific process conditions employed are set forth below in Table III. The process condition used for each catalyst system differed somewhat so that polymers having essentially the same average composition and average molecular weight could be made from each catalyst system.

TABLE III

| | Residence time*, minutes | Feed components, pounds/100 pounds of hexane solvent | | | | | Catalyst, Al/V molar ratio |
|---|---|---|---|---|---|---|---|
| | | Ethylene | Propylene | Vanadium catalyst | Hydrogen, parts per million parts ethylene | Catalyst used | |
| Polymer: | | | | | | | |
| A | 17 | 3.50 | 1.80 | 0.0094 | 53 | $VOCl_3$—$Et_2Al_2Cl_3$ | 10 |
| B | 14.5 | 3.50 | 1.60 | 0.005 | 76 | $VCl_4$—$Et_3Al_2Cl_3$ | 6 |
| C | 14.5 | 3.50 | 1.80 | 0.005 | 50 | $VCl_4$—$Et_2AlCl$ | 5 |

* 3 gallon stainless steel reactor maintained at 55° C. and p.s.i.g.

The resulting polymers were evaluated in the aforedescribed haze test. In addition, the polymers were fractionated in the following manner by conventional fractional precipitation using the temperature effect on solubility: 0.758 gram of polymer was dissolved in 100 ml. of normal decane at 95° C. and cooled to a temperature of 45° C. over a period of about 30 minutes. The polymer was then centrifuged at 45° C. and 2000 r.p.m. for 12 hours to remove the insoluble fraction which was recovered and weighed. The results are given below in Table IV.

TABLE IV.—HAZE-FORMING CHARACTERISTICS OF ETHYLENE-PROPYLENE COPOLYMERS

|  | Catalyst used to prepare polymer | | |
|---|---|---|---|
|  | $VOCl_3$—$Et_3Al_2Cl_3$ | $VCl_4$—$Et_3Al_2Cl_3$ | $VCl_4$—$Et_2AlCl$ |
| Unfractionated polymer | Polymer A | Polymer B | Polymer C |
| Mole percent ethylene | 76 | 77 | 77 |
| Inherent viscosity in Decalin at 135° C., dl./g | 1.6 | 1.5 | 1.2 |
| Haze units* | 6 | 14 | 93 |
| Fraction of polymer soluble in n-decane at 45° C.: | | | |
| Wt. percent soluble | 100.00 | 98.65 | 96.79 |
| Haze units* | 5 | 3 | 28 |
| Fraction of polymer insoluble in n-decane at 45° C.: | | | |
| Wt. percent insoluble | 0.00 | 1.35 | 3.21 |
| Mole percent ethylene | | 81 | 84 |
| Inherent viscosity in Decalin at 135° C., dl./g | | 1.7 | 1.5 |

*Polymer evaluated for haze in a reference oil which is Solvent 150 Neutral as defined in Table II.

Referring to the above table, it is seen that although the polymers were essentially of the same average composition and average molecular weight (inherent viscosity) the polymers were substantially different in haze-forming characteristics when blended with the oil. For example, oil compositions containing Polymer A were very low in haze whereas oil compositions containing Polymer B were not good in terms of haze, and oil compositions containing Polymer C were completely unacceptable from the standpoint of haze. Table IV also shows that Polymer B was further procesed to produce a low haze-forming polymer (3 haze units) within the scope of the invention by removing the polymer fraction which was insoluble in normal decane at 45° C. However, Polymer C was not sufficiently improved with respect to haze-forming characteristics by removal of the polymer fraction insoluble in normal decane at 45° C. since the soluble polymer fraction had a molecular weight distribution greater than the limits of the invention polymer. In summary, therefore, the invention polymers have molecular weight and compositional distributions such that they will not materially contribute to the haze of oil compositions when blended therewith.

Example 3

The molecular weight distribution curves presented in the drawing show that Polymer I is unimodal and has a narrow molecular weight distribution whereas Polymer II is bimodal and Polymer III has a very broad molecular weight distribution.

Polymer I corresponds to Polymer A of Example 2. Polymer II was prepared using anhydrous hydrochloric acid as a chain transfer agent whereas Polymer III was prepared without the use of a chain transfer agent. The actual polymerization conditions are shown below in Table V.

sample under test is blended with an approved base stock to a viscosity at 210° F. of 15.0±0.5 centistokes. A portion of the blend is subjected to sonic shearing forces at a specific power input and a constant temperature for 15 minutes. Viscosities are determined on the blend both before and after the treatment; the decrease in viscosity after the treatment is a measure of the molecular breakdown of the polymer under test. It is customary to examine the blend of a standard sample of known behavior each time a test is made, and to use this as a reference to establish the correct value of the sample under test. The corrected value is reported as a percent sonic breakdown which is calculated from the formula:

$$\frac{(\text{Viscosity of blend before test}-\text{Viscosity of blend after test})}{(\text{Viscosity of blend before test}-\text{Viscosity of base oil})}(100)$$

TABLE VI

|  | Thickening efficiency | $\overline{M}w/\overline{M}n$ | Percent sonic breakdown |
|---|---|---|---|
| Polymer I | 2.2 | 2.2 | 8 |
| Polymer II | 1.6 | 34.4 | 18 |
| Polymer III | 1.6 | 27.2 | 54 |

As seen from the foregoing results, Polymers II and III which are polymodal and/or have broad molecular weight distributions are substantially less resistant to shear degradation than Polymer I which has a narrow molecular weight distribution. This is the case even though Polymer I (which is a polymer of the invention) has the highest thickening efficiency. Since shear stability is inversely proportional to thickening efficiency, this example illustrates the importance of molecular weight distribution on shear stability.

Example 4

This example serves to illustrate the correlation be-

TABLE V

|  | Residence time, minutes | Feed components, grams/100 grams of hexane solvent | | | Catalyst used | Catalyst, Al/V molar ratio |
|---|---|---|---|---|---|---|
|  |  | Monomers | Catalyst | Chain transfer agent | | |
| Polymer II | ¹ 15 | ² 7.0 | 0.008 | 0.40 | $VOCl_3$—$Et_2AlCl$ | 3 |
| Polymer III | ³ 5 | ² 7.0 | 0.02 | None | $VOCl_3$—$Et_2AlCl$ | 3 |

¹ One gallon stirred glass reactor maintained at 38° C. and 5 p.s.i.g.
² Monomer feed consisted of 22 mole percent ethylene and 78 mole percent propylene.
³ One gallon stirred stainless reactor maintained at 42° C. and 15 p.s.i.g.

The molecular weight distribution ($\overline{M}w/\overline{M}n$), thickening efficiency and sonic breakdown characteristics of Polymers I, II, and III are shown below in Table VI.

With respect to the sonic breakdown, this is a standard measurement for determining the shear stability of polymer-oil compositions, the lower percentage reflecting which compositions have the greatest resistance to shear breakdown and, hence, which are the most stable under automotive lubricating conditions. In this method the tween the degree of crystallinity of a copolymer of the instant invention and its potency as a V.I. improver. In this example, a number of ethylene-propylene copolymers were prepared in accordance with the procedure of Example 1 except that the ethylene-propylene feed ratios were controlled to give various polymer compositions which were examined for their degrees of crystallinity by X-ray diffraction. The procedure utilized was similar to that of Weidinger and Hermans, Makromolekular Chem., 50, 98 (1961). The method of determining the crystalline fraction in the ethylene-propylene polymer consisted of: (1) obtaining a diffractogram of the ethylene-propylene copolymer sample, (2) measuring the amorphous and crystalline areas of the diffractogram and (3) calculating the percent crystallinity from these two measurements.

The method is based upon taking a series of diffractograms of ethylene-propylene copolymer samples that vary in crystallinity. The data is normalized to the same absorbance. A plot of the normalized crystalline area versus the normalized amorphous gives a linear relation between the two quantities. This allows the calculation of the crystalline fraction in any other sample from the observed crystalline and amorphous areas.

The V.I. of each of these ethylene-propylene copolymer samples were compared at equal viscosity average molecular weight (equal thickening power) and the resulting data in terms of percent crystallinity and V.I. are presented in Table VII.

TABLE VII

| Sample No.: | Mole percent, ethylene | Thickening efficiency | Percent crystallinity | V.I.[1] |
|---|---|---|---|---|
| 1 | 60 | 2.0 | 0.0 | 128 |
| 2 | 72 | 2.0 | 2.64 | 131 |
| 3 | 77 | 2.0 | 11.47 | 136 |
| 4 | 78 | 2.0 | 13.87 | 140 |
| 5 | 80 | 2.0 | 19.75 | 136 |
| 6 | 81 | 2.0 | 24.82 | [2]131 |
| 7 | 82 | ([3]) | ([3]) | ([3]) |

[1] Viscosity index as determined by ASTM D-567 in Solvent 150 Neutral which is a solvent extracted, neutral, paraffinic-type oil having a viscosity of 150 SUS at 100° F.
[2] Polymer produced visible haze in Reference Oil 150.
[3] Substantially insoluble in oil.

It can be seen from the foregoing that the polymer crystallinity and ethylene content has an important effect on the V.I. properties of the polymer.

It is not intended that this invention be limited to the specific examples presented by way of illustration. The scope of the invention is limited only by the appended claims.

What is claimed is:

1. A low haze oil composition comprising a major proportion of a lubricating oil and about 0.01 to 30% by weight of an oil-soluble polymer formed by copolymerizing ethylene and a $C_3$–$C_{18}$ alpha-olefin, said polymer being characterized by the following combination of parameters:
    (a) an ethylene content within the range between about 60 and 80 mole percent;
    (b) a degree of crystallinity less than about 25%
    (c) an $\overline{M}w/\overline{M}n$ ratio less than about 4.0;
    (d) a viscosity average molecular weight within the range between about 10,000 and 200,000; and
    (e) wherein said polymer contains no more than about 1.3% by weight of a polymer fraction which is insoluble in normal decane at 45° C.

2. The composition of claim 1 wherein said alpha-olefin is propylene.

3. The composition of claim 2 wherein said polymer has a viscosity average molecular weight within the range between about 30,000 and 100,000.

4. The composition of claim 3 wherein said polymer has an ethylene content within the range between about 72 and 80 mole percent and an $\overline{M}w/\overline{M}n$ ratio less than about 2.6.

5. The composition of claim 3 wherein said polymer is present in a concentration ranging from 0.3 to 2.5% by weight based on oil.

6. A composition according to claim 4 wherein said polymer contains no more than about 0.5% by weight of a polymer fraction which is insoluble in normal decane at 45° C.

7. The composition according to claim 5 wherein said polymer contains no fraction which is insoluble in normal decane at 45° C.

8. The composition of claim 2 wherein said polymer is comprised of 0 to 10 mole percent of a third monomer selected from the group consisting of $C_4$–$C_{18}$ alpha-olefins, $C_6$–$C_{28}$ nonconjugated diolefins, and combinations thereof.

9. An oil concentrate comprising a hydrocarbon solvent and 5 to 50 weight percent based on solvent of a polymer formed by copolyymerizing ethylene and propylene characterized by the following combination of parameters;
    (a) an ethylene content within the range between about 60 and 80 mole percent;
    (b) a degree of crystallinity less than about 25%;
    (c) an $\overline{M}w/\overline{M}n$ ratio less than about 4.0;
    (d) a viscosity average molecular weight within the range between about 10,000 and 200,000; and
    (e) wherein said polymer contains no more than about 1.3% by weight of a polymer fraction which is insoluble in normal decane at 45° C.

10. An oil concentrate according to claim 9 wherein said polymer contains no fraction which is insoluble in normal decane at 45° C.

References Cited

UNITED STATES PATENTS

| 3,112,297 | 11/1963 | Gordon et al. | 252—59X |
| 3,222,332 | 12/1965 | Duck et al. | 260—88.2X |
| 3,260,708 | 7/1966 | Natta et al. | 260—88.2X |
| 3,389,087 | 6/1968 | Kresge et al. | 252—59 |
| 3,440,237 | 4/1969 | Mottus | 252—59X |

PATRICK P. GARVIN, Primary Examiner

W. H. CANNON, Assistant Examiner

U.S. Cl. X.R.

260—88.2